Oct. 9, 1928.
F. W. LOVEJOY
1,687,100
MOTION PICTURE FILM STRIP
Filed Aug. 23, 1926
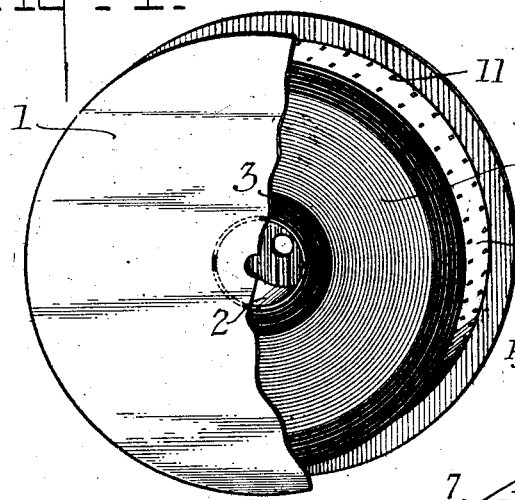
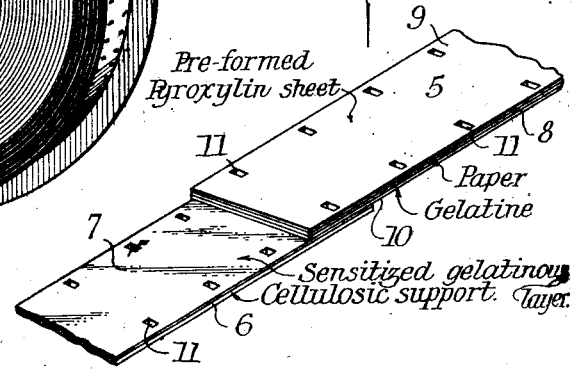
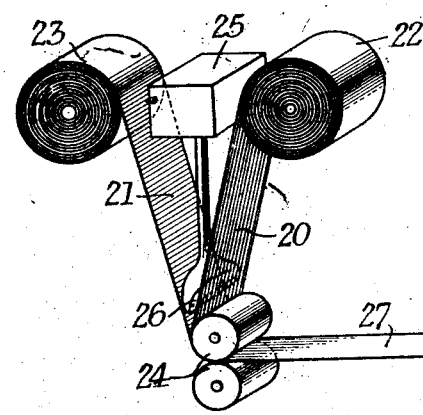
Frank W. Lovejoy,
INVENTOR,
BY
ATTORNEYS.

Patented Oct. 9, 1928.

1,687,100

UNITED STATES PATENT OFFICE.

FRANK W. LOVEJOY, OF ROCHESTER, NEW YORK, ASSIGNOR TO EASTMAN KODAK COMPANY, OF ROCHESTER, NEW YORK, A CORPORATION OF NEW YORK.

MOTION-PICTURE-FILM STRIP.

Application filed August 23, 1926. Serial No. 130,791.

This invention relates to motion picture film and more particularly to such film as is furnished in a cartridge for daylight loading in a portable camera.

As thus furnished, a typical cartridge comprises a reel having wound thereon a film strip comprising a sensitized film band with protective paper bands attached to the ends thereof. This may be used in cameras of various types, typical examples being shown in the patents to Tessier, 1,572,252, granted Feb. 9, 1926; and Wittel, 1,588,082, granted June 8, 1926.

In such apparatus, the film strip is fed in self-supported loops from a feeding means such as a sprocket, to a gate and from the gate to a feeding means. The sensitized film band, being of a plastic cellulosic material, is sufficiently stiff and elastic to maintain such loops without difficulty. The paper protective bands, however, have much less body and there is sometimes a tendency for them to buckle as they are being fed through the mechanism. This is particularly liable to be the case where the cartridge has been subjected to humid atmospheric conditions tending to make the paper especially limp. Under such conditions, moreover, the protection afforded the sensitive film band by the paper against atmospheric influences is lessened.

The objects of my invention are, therefore, to increase the stiffness and elasticity of the protective bands, to render such bands waterproof, and thus to increase the protection afforded the sensitized film, and to render them readily attachable to the film.

These objects are attained by laminating to one surface of the protective paper a pre-formed film of pyroxylin or like cellulosic composition, thinner than the support of the sensitized portion.

In the accompanying drawing, Fig. 1 is a perspective view of a reel of film embodying my invention, one flange being partly broken away.

Fig. 2 is a perspective view on an enlarged scale of a portion of the film strip, including the junction of the sensitized portion and a protective portion, the thicknesses being much exaggerated.

Fig. 3 is a diagrammatic showing of the apparatus used in forming the protective bands.

Fig. 4 is an edge view, with the thicknesses much exaggerated, of a modified form of my invention showing the junction of the sensitized and protective portions.

The film cartridge, as furnished for camera use, comprises a reel having side flanges 1, and a core 2, upon which is wound a protective portion 3, coiled directly on the core, an unexposed sensitized film portion 4 attached at one end to the outer end of the protective portion 3 and an outer leader band or protective portion 5 attached at one end to the outer end of the coiled sensitized portion 4 and wound around it, the protective portions 3 and 5 thus forming continuations of the sensitized portion 4 and the three portions 3, 4 and 5 constituting in effect a single, coiled film strip having the usual perforations 11.

The sensitized portion consists, as is usual, of a support 6 of a plastic cellulosic composition, such as one of cellulose acetate, cellulose nitrate, cellulose ether, viscose or the like, (preferably cellulose acetate), upon one surface of which is a light sensitive gelatino-silver-halide layer 7.

The leader band 5 consists of a paper band 8 to one surface of which has been laminated a pre-formed sheet or film 9 of a cellulosic composition of the type described, by means of an adherence inducing medium, varnish or cement.

The sheet 9 need not be as thick as the support 6. In practice, I have found that the support may advantageously be about .005 inch thick and the sheet 9 about .003 inch thick and the paper 8 about .003 inch thick. These dimensions are, of course, illustrative only and are mentioned by way of example.

While the manner of assembling may be varied, a convenient method would be to form a long band of the cellulosic film and apply this to a long band of paper, the two bands being advanced from supply rolls to an adhesive applying station, and the gelatine coating being applied as a later separate step. This is shown in a purely diagrammatic way in Fig. 3, wherein bands of paper 20 and film 21 are supplied from reels 22 and 23 and drawn in contact between rollers 24, a liquid adhesive from a tank 25 being applied at 26 just before the bands contact. The combined band 27 is coated with liquid gelatine at 28, and the coated sheet later slit at 29 and the narrow bands 30 wound on reels 31. The individual steps of this process would be carried on at points sufficiently separated to allow the band to be properly conditioned and by apparatus of types already known in the art.

If the film or sheet 9 is one of the common pyroxylin type, the cement or varnish used to cause it to adhere to the paper may be the following:

| | Parts by weight. |
|---|---|
| Cellulose nitrate | 100 |
| Fusel oil or butyl alcohol | 50 |
| Methyl alcohol | 400–2000 |
| Camphor | 2–40 |

This is merely given by way of example as many equivalent and suitable formulæ are known. If the film embodies cellulose acetate or ether, other well known formulæ suitable for use with them would be used, such as:

| | Parts by weight. |
|---|---|
| Cellulose acetate | 100 |
| Diethyl phthalate | 10–50 |
| Acetone | 400–2000 | or

| | |
|---|---|
| Water-insoluble ethyl cellulose | 100 |
| Toluol | 10–50 |
| Volatile solvent (mixture of methyl acetate with one ninth its weight of methyl alcohol) | 400–2000 |

If desired, the leader strip may be applied to the support side of the sensitized film strip, as shown in Fig. 4, the pre-formed sheet 9 of pyroxylin or the like being attached to the cellulosic support 6 by the use of any common solvent or known film cement, such, for instance, as a mixture of equal volumes of acetone, methyl alcohol, butyl acetate and methyl acetate. When so applied, the gelatine layer may be omitted as shown in this figure.

The specific forms herein disclosed are by way of example. It is obvious that numerous embodiments are possible, and I contemplate as within my invention all such modifications and equivalents as fall within the scope of the appended claims.

Having thus described my invention, what I claim as new and desire to secure by Letters Patent is:

1. A motion picture film strip including a band of sensitized film with a protective band at each end thereof, one end of each protective band being secured to one end of the film band, the film band comprising a support of cellulosic film and a sensitive layer thereon and each protective band comprising a strip of paper and a pre-formed film of cellulosic material thinner than the film support and coextensive with the strip of paper and adherently secured thereto.

2. A motion picture film strip including a sensitized band comprising a support of flexible cellulosic film with a sensitized gelatine layer thereon and a leader band comprising a strip of paper carrying adherently upon one surface a pre-formed film of cellulosic material thinner than the film support and upon the other surface a layer of gelatine, one end of the leader band having its gelatine surface adherently attached to the gelatine layer at one end of the film band.

Signed at Rochester, New York, this 17th day of August, 1926.

FRANK W. LOVEJOY.